(12) United States Patent
Bondarenko et al.

(10) Patent No.: US 9,168,467 B1
(45) Date of Patent: Oct. 27, 2015

(54) ASSEMBLY FOR SEPARATING GAS MIXTURES IN FRACTIONATING COLUMNS

(71) Applicants: Vitaly Leonidovich Bondarenko, Moscow (RU); Iurii Mikhailovich Simonenko, Odessa (UA)

(72) Inventors: Vitaly Leonidovich Bondarenko, Moscow (RU); Iurii Mikhailovich Simonenko, Odessa (UA)

( * ) Notice: Subject to any disclaimer, the term of this patent is extended or adjusted under 35 U.S.C. 154(b) by 0 days.

(21) Appl. No.: 14/380,093

(22) PCT Filed: Mar. 19, 2013

(86) PCT No.: PCT/RU2013/000222
§ 371 (c)(1),
(2) Date: Oct. 30, 2014

(87) PCT Pub. No.: WO2013/141761
PCT Pub. Date: Sep. 26, 2013

(30) Foreign Application Priority Data

Mar. 20, 2012 (RU) ................ 2012110459

(51) Int. Cl.
*F25J 3/02* (2006.01)
*B01D 3/14* (2006.01)

(52) U.S. Cl.
CPC .... *B01D 3/14* (2013.01); *F25J 3/02* (2013.01)

(58) Field of Classification Search
CPC ........................................................ F25J 3/02
USPC .................... 62/617; 202/152, 153, 154, 158
See application file for complete search history.

(56) References Cited

U.S. PATENT DOCUMENTS

| | | | |
|---|---|---|---|
| 2,780,526 A * | 2/1957 | Fleck | ............................ 205/627 |
| 6,612,129 B2 | 9/2003 | Schwenk | |
| 7,297,237 B2 | 11/2007 | Asano et al. | |

FOREIGN PATENT DOCUMENTS

| | | |
|---|---|---|
| RU | 2254905 C1 | 6/2005 |
| RU | 2295679 C1 | 3/2007 |
| RU | 2330009 C1 | 7/2008 |

* cited by examiner

*Primary Examiner* — Robert A Hopkins
(74) *Attorney, Agent, or Firm* — Nadya Reingand

(57) ABSTRACT

The invention relates to cryogenic technology, namely, to devices for obtaining components of gas mixtures by rectification method, particularly, neon isotopes. The device comprises housed in jackets rectification columns, forming connected in series head and N–1 consecutively installed sections, containing contact spaces, whose upper areas are connected with condensers, whose inner surfaces contact with the mixture to be separated in the rectification columns, and outer surfaces—with the cooling medium, which, through gas recuperative heat exchangers, are connected by the line of the working body return flow to the compressor and the working body separator with the connecting pipe of the gas phase, condensers are grouped into blocks of condensers in sections which have common cavities of the cooling medium and, at least, one of N installed sections consists of groups of $n_j$ (j=1 ... N) rectification columns connected in parallel.

7 Claims, 6 Drawing Sheets

ASSEMBLY FOR SEPARATING GAS MIXTURES IN FRACTIONATING COLUMNS

The invention relates to cryogenic technology, specifically, to devices for obtaining components of gas mixtures by rectification method, particularly, gas mixtures characterized by a small value of separation factor, for example, neon isotopes.

PRIOR ART

A known device for separating neon to isotopes by rectification in the conditions of cryogenic temperatures [Bewilogua. P., Gacdicke K., Vergea P. Vortrag auf der 4, Arbeitsagung über stabile Isotope:—Leipzig, 1963] comprises one rectification column.

A disadvantage of this device is its relatively low capacity due to a limited height of a contact space in a single rectification column which causes a repeated separation of partially enriched components in the same rectification column. Furthermore, the device is characterized by a relatively low concentration of the streams of light ($^{20}$Ne) and heavy ($^{22}$Ne) components obtained in the column.

A known method for separating hard to separate mixtures in the rectification columns [RU 2254905, C1, B01D59/04, F25J3/02, 27.06.2005] comprises rectification columns, apparatuses connected by pipelines, armatures of high and low pressure cycles located in the jacket, a high pressure compressor; moreover, at least, one rectification column is divided into the head section of the column, intermediate sections of the column and the bottom section of the column; the head section of the rectification column and each intermediate section of the rectification column have connecting pipes for liquid outlet and vapor inlet in the lower part under the contact space; the bottom section of the rectification column and each intermediate section of the rectification column have connecting pipes for liquid inlet and vapor outlet and a fitting in the upper part above the contact space; connecting pipes for vapor inlet and outlet of different sections are connected in series by vapor lines, and connecting pipes for liquid inlet and outlet of the same sections are connected by liquid pipes with additionally installed flow boosters; moreover, flow boosters and the head section of the rectification column in the upper part contain condensers, whose cavities of a cooling medium are included into the circulation loop of high and low pressure cycles.

This device is the closest to the claimed device in its technical essence and the number of common features whereby it is accepted as a prototype.

A disadvantage of the closest technical solution is its long start-up period. During this time, contact spaces of the rectification column (especially, last sections) must be filled with liquid (reflux), enriched with the target components, for example, ($^{21}$Ne and $^{22}$Ne). The amount of the named components entering the separation loop is proportional to the mixture flow rate fed to the head section and the concentration of ($^{21}$Ne и $^{22}$Ne) in it. Considering that this concentration is in many cases predetermined, for example, by the isotope composition of the "natural" neon 0.095; (9.5%), then the only way to accelerate the accumulation process ($^{21}$Ne и $^{22}$Ne) is to improve efficiency of the head section [*Theory of Isotope Separation in Columns* A. M. Rozen, Moscow 1960 p. 437] increasing the cross section of its contact spaces. However, the increase of the cross section of the rectification column leads to the disruption of mass transfer between the vapor streams and the reflux. This reduces the separation efficiency of the rectification column and causes the drop of the amount of the accumulated in the loop target products, needed for the formation of the reflux enriched by the target products.

To reduce a start-up period, it is necessary to perform two seemingly contradictory conditions: to expand the cross section of the contact spaces of the head section (avoiding increasing its diameter in the process); to reduce the volume of the contact space of the last section, in whose reflux the concentration of the target components, for example, ($^{21}$Ne и $^{22}$Ne) must be the highest. As long as single columns are used in the sections of the prototype device, these two conditions are not fulfilled.

Another disadvantage of the known technical solution is its big material intensity and overall dimensions. Introduction of gas lifts, each containing a separate condenser, in the loop leads to the inefficient filling of the volume of the vacuum jacket. This causes an increase in the size of the low temperature block and, as a consequence, the growth of energy consumption required for cryogenic implementation of the separation process.

The required technical solution consists in reducing material intensity and overall dimensions of the device, as well as in reducing the duration of the start-up period in the process of separation of hard to separate mixtures, for example, neon isotopes.

Patent Disclosure

The required technical result is achieved in that in the device for separating gas mixtures in rectification columns comprising housed in jackets rectification columns, forming connected in series head and N−1 consecutively installed sections, containing contact spaces, whose lower areas are connected with the bottoms, containing submerged evaporators, and the upper areas are connected with condensers, whose number corresponds to the number of rectification columns, manufactured in the form of upper and lower tube sheets, collectors, a set of tubes, whose inner surfaces contact with the separable mixture in the rectification columns, and outer surfaces—with the cooling medium in the cavities of cooling medium, which, through gas recuperative heat exchangers, are connected by the line of the working body return flow to the compressor, submerged heat exchanger and the working body separator with the connecting pipe of the gas phase, condensers are grouped into blocks of condensers in sections which have common cavities of the cooling medium and, at least, one of N installed sections is made up of groups of $n_j$ (j=1 ... N) rectification columns connected in parallel.

Furthermore, the required technical result is achieved in that the number of connected in parallel rectification columns $n_j$ in j-sections changes according to geometric progression $n_j = n_1 \cdot (r+1)^{1-j}$, where r is a natural number and $n_1$ is equal to the number of connected in parallel rectification columns in the head section, besides, $n_1 = (r+1)^{N-1}$.

Moreover, the required technical solution is achieved in that condensers of the block of condensers in sections have tubes of equal height and identical tube sheets, and cavities of the cooling medium of the condensers of blocks of condensers in sections are connected with each other in the upper and lower parts by two lines providing the same levels of liquid in the cavities of the cooling medium.

Furthermore, the required technical solution is achieved in that the tube sheets of the blocks of condensers in sections have a form of a ring or a fragment thereof on the plan and are mounted coaxially the condenser of the N-section, made cylindrical.

Furthermore, the required technical solution is achieved in that the upper and lower tube sheets of each condenser of the block of condensers are supplied with collectors forming pairs of closed cavities connected with each other via the tube inner cavities of condenser heat exchange surfaces.

Furthermore, the required technical solution is achieved in that lateral sides of the cavity of the cooling medium of each condenser of the block of condensers in sections are connected with the tube sheets which perform the function of the bottom of cavity of the cooling medium of the condensers of the blocks of condensers.

Furthermore, the required technical solution is achieved in that, at least, one rectification column is shifted relative to the jacket axis; besides, bottoms of the rectification columns are made with eccentricity relative to the axes of the corresponding rectification columns.

Table 1 shows parameters of flows of a working body and an isotope separable mixture using neon as an example.

Figure 7:
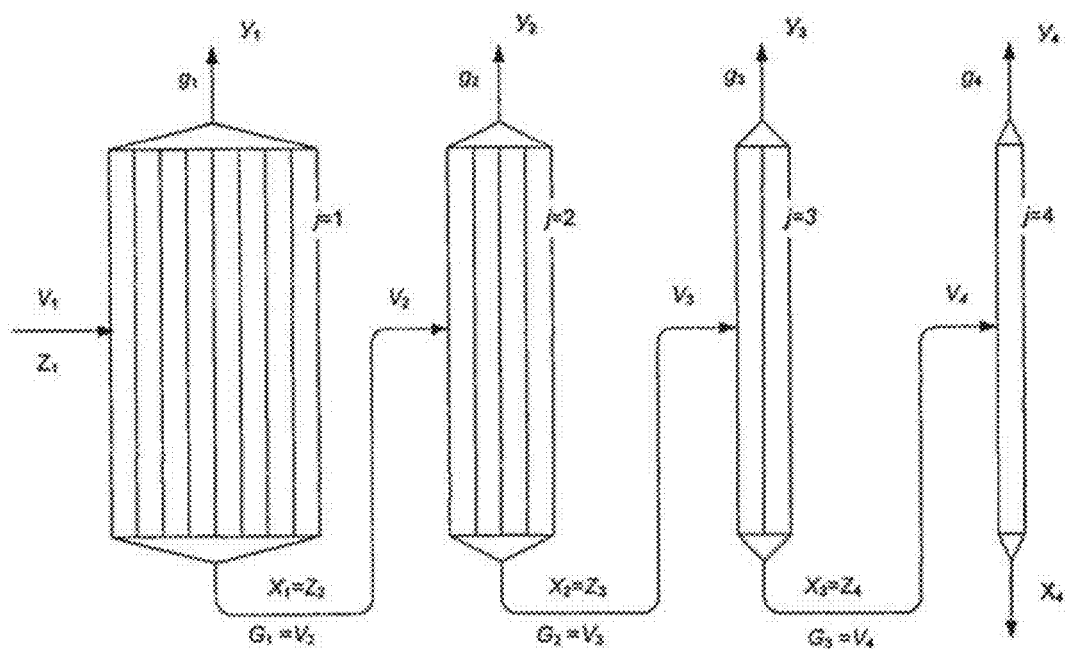
FIG. 7 shows a computational scheme and notation for the special case when the number of consecutively installed next to each other sections is N=4.

Table 2 shows concentrations Z, X and Y of a heavy component ($^{22}$Ne) at the inlet and outlet of the rectification columns, according to FIG. 7.

Table 3 shows results of calculation of the number of columns $n_j$ in groups which form N-consecutively connected sections according to the law $n_j=n_1 \cdot (r+1)^{1-j}$, where $n_1=(r+1)^{N-1}$ is the number of columns in the group making up the head section, r—is a natural number (1, 2, 3 . . . ).

DESCRIPTION OF PREFERRED EMBODIMENT

Device for separating gas mixtures in rectification columns comprises rectification columns (FIG. 1) of the head 1, second 2 and third 3 consecutively installed next to each other sections. Head section 1 consists of a group of four rectification columns connected in parallel, and the second section 2 consists of a group of two rectification columns connected in parallel. Each rectification column has contact spaces 4 which perform the function of a mass transferring surface, on which separation of the mixture into components occurs. Lower areas of the contact spaces 4 are connected with the bottoms 5, containing submerged evaporators 6. Upper areas of the contact spaces 4 are connected with condensers 7, which have heat exchange surfaces 8, which are washed outside by the cooling medium 9, boiling in the cavities 10 of the cooling medium. Condensers 7 of the head 1 and the second 2 sections are combined into blocks 11, which have common cavities 10 of the cooling medium. Outlet connecting pipes 12, of the cavities 10 of the cooling medium are connected to the line 13 of the return stream of the working body. Inlet connecting pipes 14 of the cavities 10 of the cooling medium are connected with flow control regulators 15 of the submerged evaporators 6. In the upper part of the condensers 7 there are lines 16 of stripping for a light component discharge, for example, $^{20}$Ne.

Line 17 of feeding a preliminarily cooled separable mixture (FIG. 1) is connected to the middle part of the contact spaces 4 of the group of rectification columns of the head section 1. Lines 18 for the withdrawal of the heavy component exit from the lower points of the bottoms 5 of the rectification columns of the first 1 and the second 2 sections; they are introduced into the middle of the contact spaces 4 of the rectification columns of the second 2 and the third 3 sections, respectively. The bottom 5 of the rectification column of the third section 3 is supplied with the line 19 for the heavy component withdrawal (for example, $^{22}$Ne or the mixture $^{21}$Ne+$^{22}$Ne). Inlet connecting pipes of the submerged evaporators 6 in the bottoms 5 are connected to the line 20 of the direct flow of the working body of the low pressure.

Line 13 of the return flow of the working body is connected to the compressor 21. Line 22 of the direct flow of the working body of high pressure passes in sequence through the first recuperative gas heat exchanger 23, submerged heat exchanger 24, the second recuperative gas heat exchanger 25 and, finally, a throttle 26. The separator 27 of the working body is installed after the throttle 26. The upper part of the separator 27, where the gas phase is being formed, is connected to the line 20 of the direct flow of the working body of low pressure, and the lower part, where the liquid is collected, is connected to the outlet fittings of the flow control regulators 15 of the submerged evaporators 6 through throttles 28.

Figure 1:
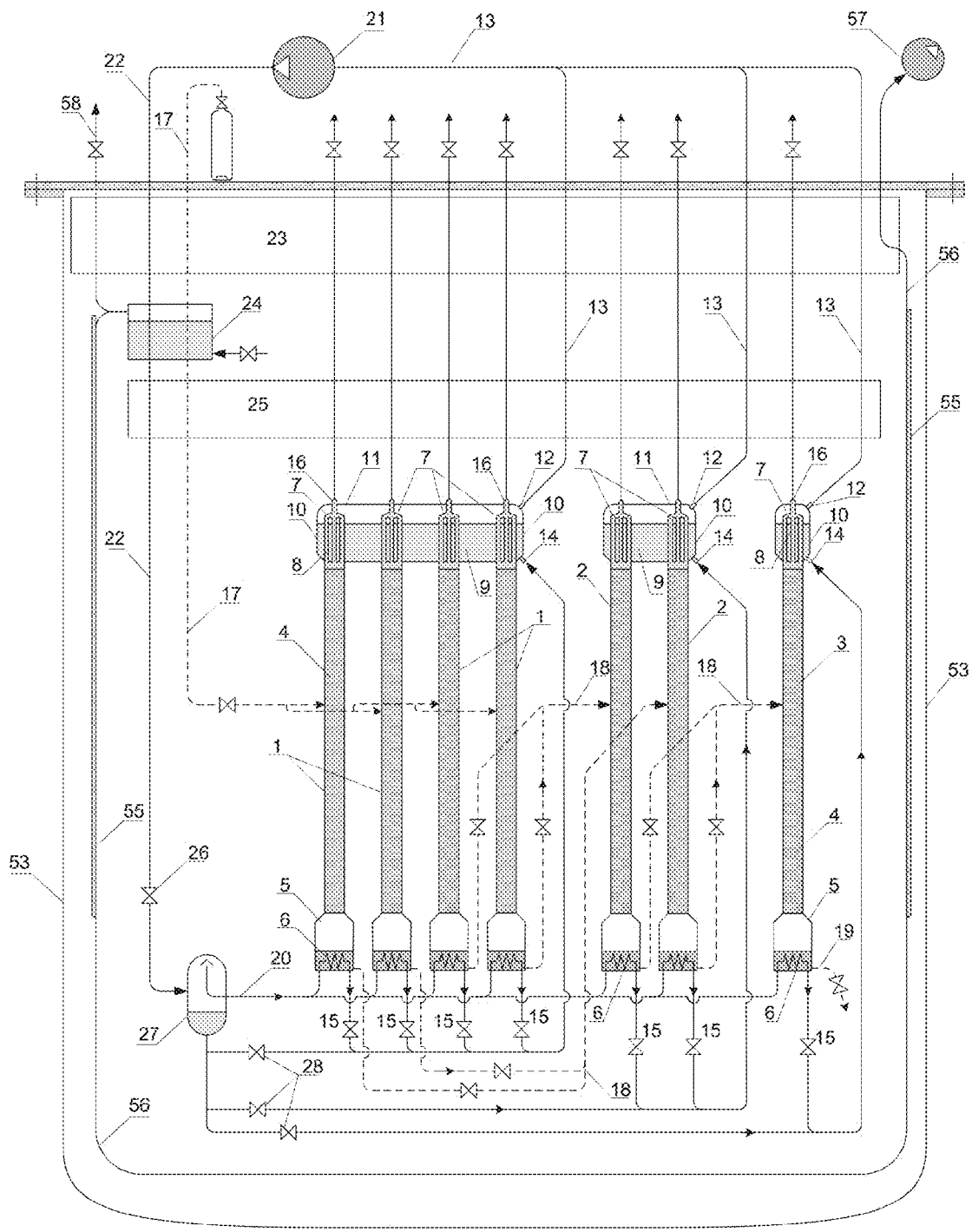
FIG. 1 shows a functional diagram of the device for separating gas mixtures in rectification columns for a special case when the number of consecutively installed next to each other sections is N=3. The number of rectification columns in the sections $n_1=4$, $n_2=2$, $n_3=1$ changes according to the Law of geometric progression $n_j=n_1 \cdot (r+1)^{1-j}$ with the common ratio 2 (for the case r=1). Besides, the condensers of the head section and the second section are united in the blocks of condensers of sections and have common cavities of the cooling medium.
Figure 2:
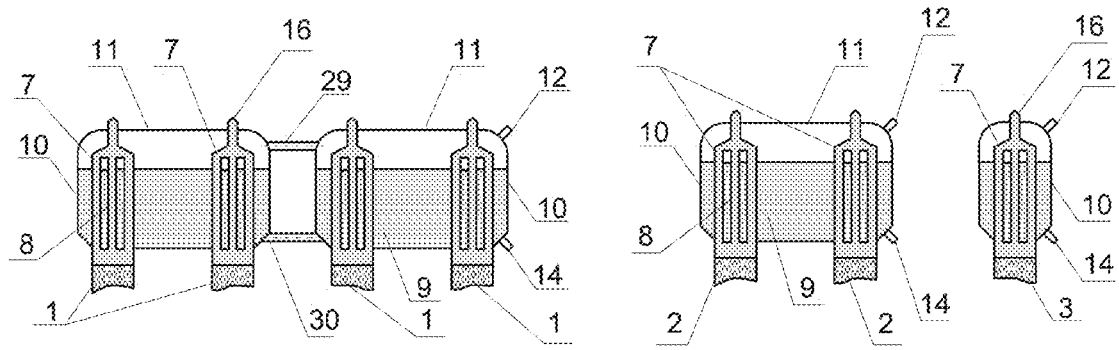
FIG. 2 shows an example of execution of blocks of condensers in sections for the device similar to the one presented in FIG. 1. In the first (head) section and in the second section, blocks of condensers of the same type, which have tubes of equal height, are used. Furthermore, cavities of the cooling medium of the same type block of condensers of the head section in the upper and lower parts are connected by two lines providing equal levels of liquid in the cavities of the cooling medium.

Condensers 7 of the group of rectification columns of the second section 2 are combined into the block 11 of condensers, which have the common cavity off the cooling medium 10 (FIG. 2). Two single type blocks of condensers, identical to the block of condensers in the second section (FIG. 1, 2) are used in the head (first)) section consisting of a group of four rectification columns.

Cavities of the cooling medium 10 of the blocks 11 of condensers of the head section 1 are connected with each other by the upper 29 and lower lines 30, providing the same levels of liquid in the cavities of the cooling medium.

Figure 3:
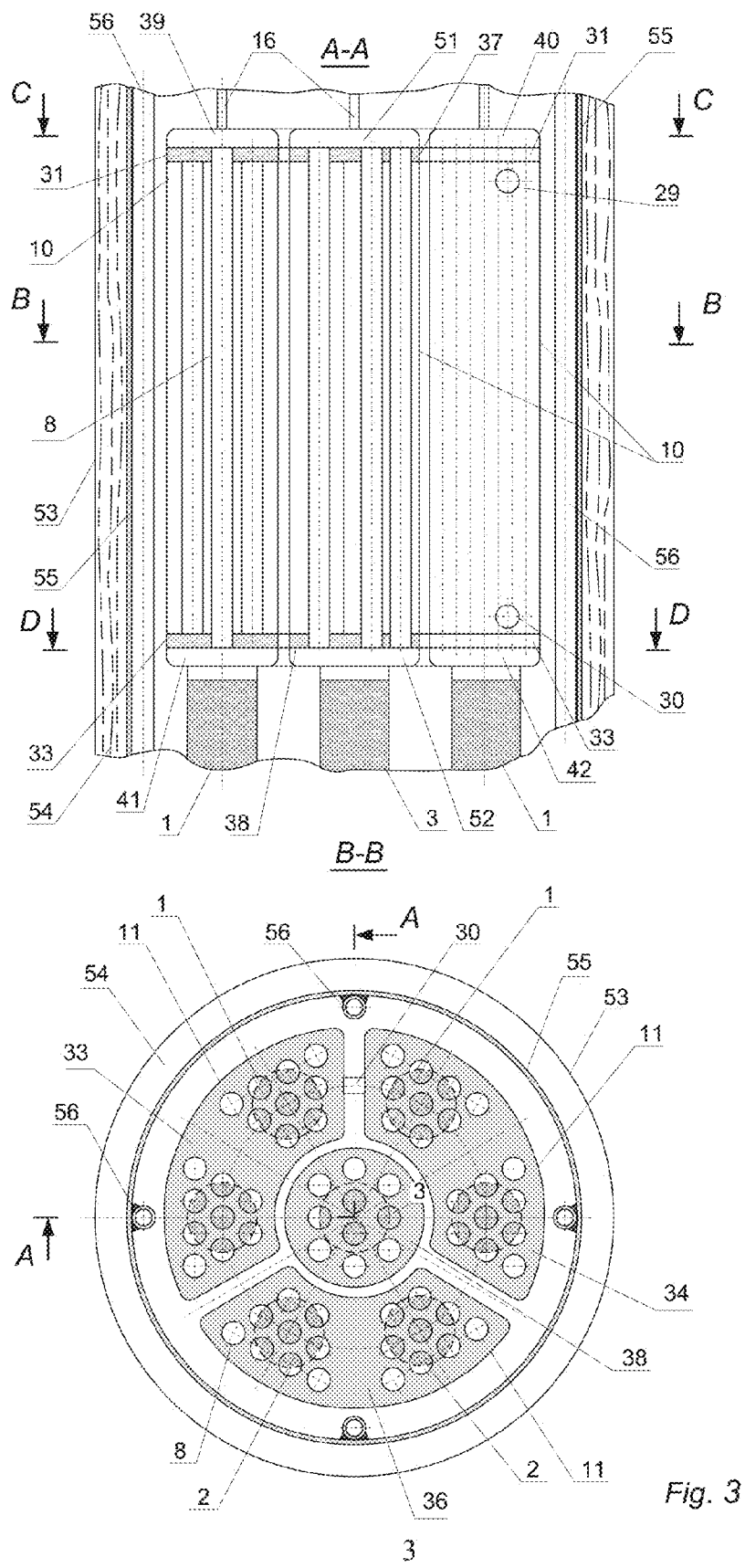
FIG. 3 shows longitudinal (A-A) and cross-sectional (C-C) views of the condensers according to FIG. 2, combined in the same type blocks of condensers of sections with tubes of the same height and identical tube sheets in the first (head) and the second sections. Furthermore, cavities of the cooling medium of the same type blocks of condensers of the head section are connected in the upper and lower parts by two lines providing equal levels of liquid in the cavities of the cooling medium.
Figure 4:
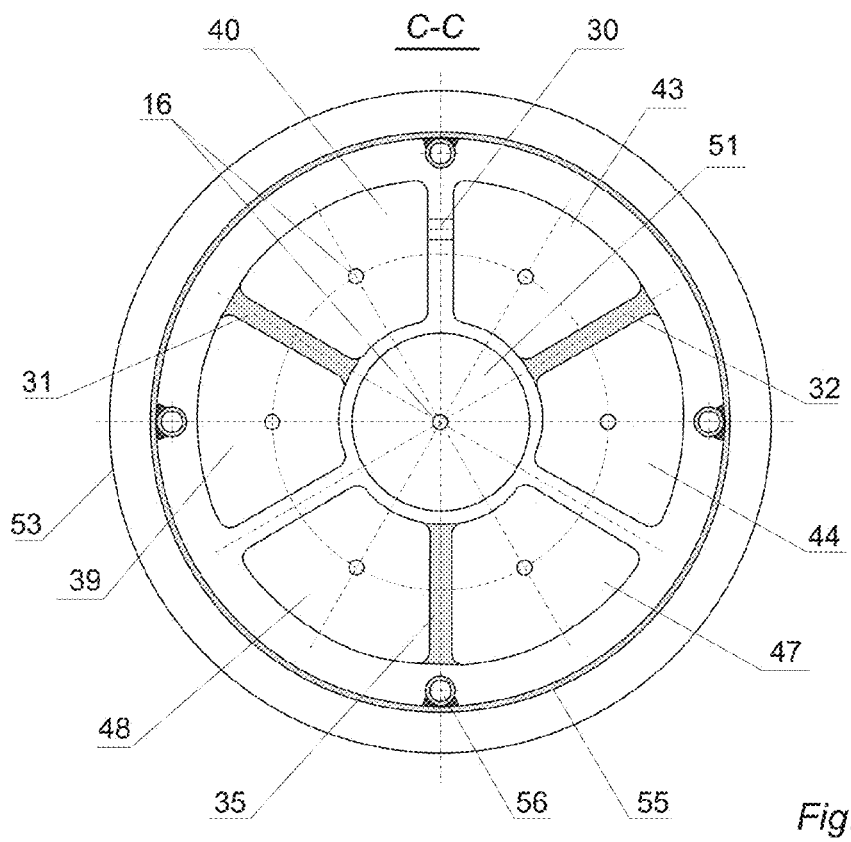
FIGS. 4 and 5 show cross-sectional views (C-C) и (D-D) of the block of condensers according to FIGS. 2 and 3 which has single type blocks in the first (head) and the second sections. Furthermore, cavities of the cooling medium of single type blocks of condensers in the head section are connected in the upper and lower parts by two lines providing equal levels of liquid in the cavities of the cooling medium.
Figure 5:
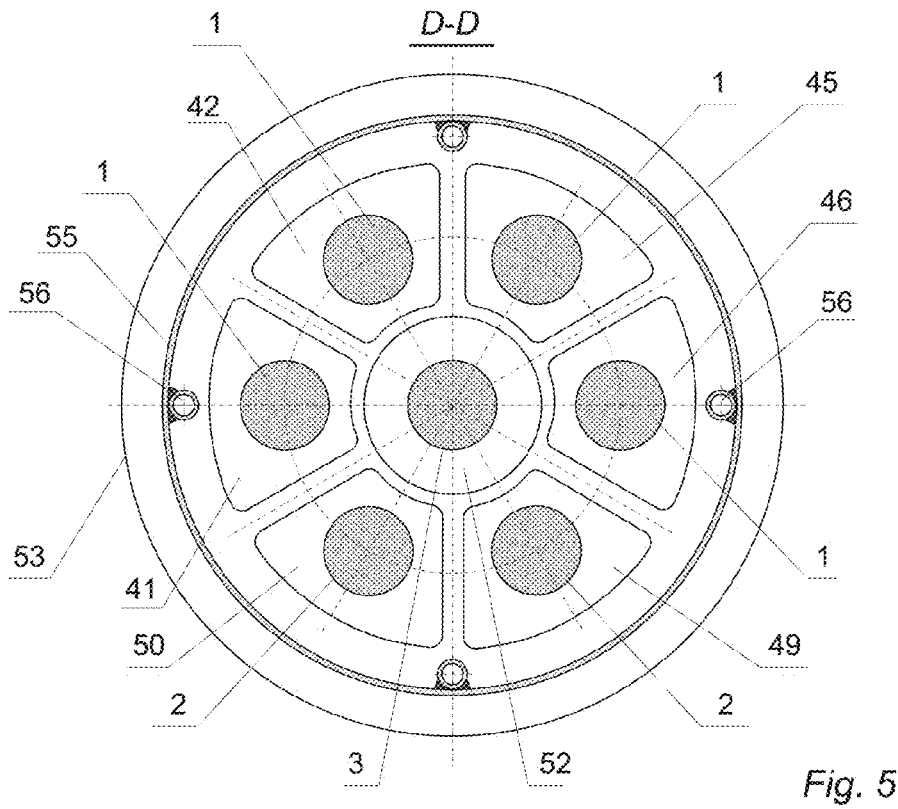

Condensers 7 of the group of rectification columns of the head (first) section 1 are made in the form of two single type blocks 11, having the first 31 and the second 32 upper and the first 33 and the second 34 lower tube sheets. On the plan they are represented as fragments of a circular ring with a central angle close to 120° (FIG. 3). Similar unified block includes condensers 7 of the rectification columns of the second section 2. Block 11 of condensers 7 of rectification columns of the second section 2 has upper 35 and lower 36 tube sheets. Blocks 11 of condensers 7 of rectification columns, forming the head (first) 1 and the second 2 sections, are located coaxially to the condenser of the rectification column of the third section 3, having the upper 37 and the lower 38 tube sheets in the form of discs.

The first upper tube sheet 31 of the block 11 of condensers 7 of the group of rectification columns of the head (first) section 1 is connected to the first 39 and the second 40 upper collectors, and the first lower tube sheet 33 of the block 11 of condensers 7 of the group of rectification columns of the head (first) section 1 is connected to the first 41 and the second 42 lower collectors. Pairs of collectors 39-41 and 40-42 are connected with each other via tubes of heat exchanging surfaces 8 of condensers 7 of the block 11 of condensers and are connected to the upper parts of the group of rectification columns of the first section 1 and the lines of stripping 16 of the light component.

Similarly, the second upper tube sheet 32 of the head (first) section 1 is connected with the third 43 and the fourth 44 upper collectors, and the second lower 34 tube sheet of the head (first) section 1—to the third 45 and the fourth 46 lower collectors of the head (first) section 1. Pairs of collectors 43-45 and 44-46, connected to each other via tubes of heat exchanging surfaces of the block of condensers 11, are formed in the process.

In the same way, the upper tube sheet 35 of the group of rectification columns of the second section 2 is connected with the first 47 and the second 48 upper collectors of the second section 2, and the lower tube sheet 36—with the first 49 and the second 50 lower collectors of the second section 2. Pairs of collectors 47-49 and 48-50, connected to each other via tubes of heat exchanging surfaces 8 of the block 11 of condensers 7, are formed in the process.

These pairs are also tied by the upper parts of the contact spaces 4 of the group of rectification columns of the second section 2 with the corresponding stripping lines 16 of the light component.

Upper tuber sheet 37 of the rectification column of the third section 3 is connected with the upper collector 51 of the third section 3, and the lower tube sheet 38 is connected with the lower collector 52 of the third section 3. A pair of collectors, connected to each other via tubes of heat exchanging surfaces 8 of the block 11 of condensers 7, which ties the upper part of the contact space 4 of the rectification column of the third section 3 with the corresponding stripping line 16 of the light component, is formed in the process.

Tube sheets of the blocks of condensers are connected with the lateral surfaces of the cavities of the cooling medium 10 and, in fact, perform the function of the bottom.

Figure 6:
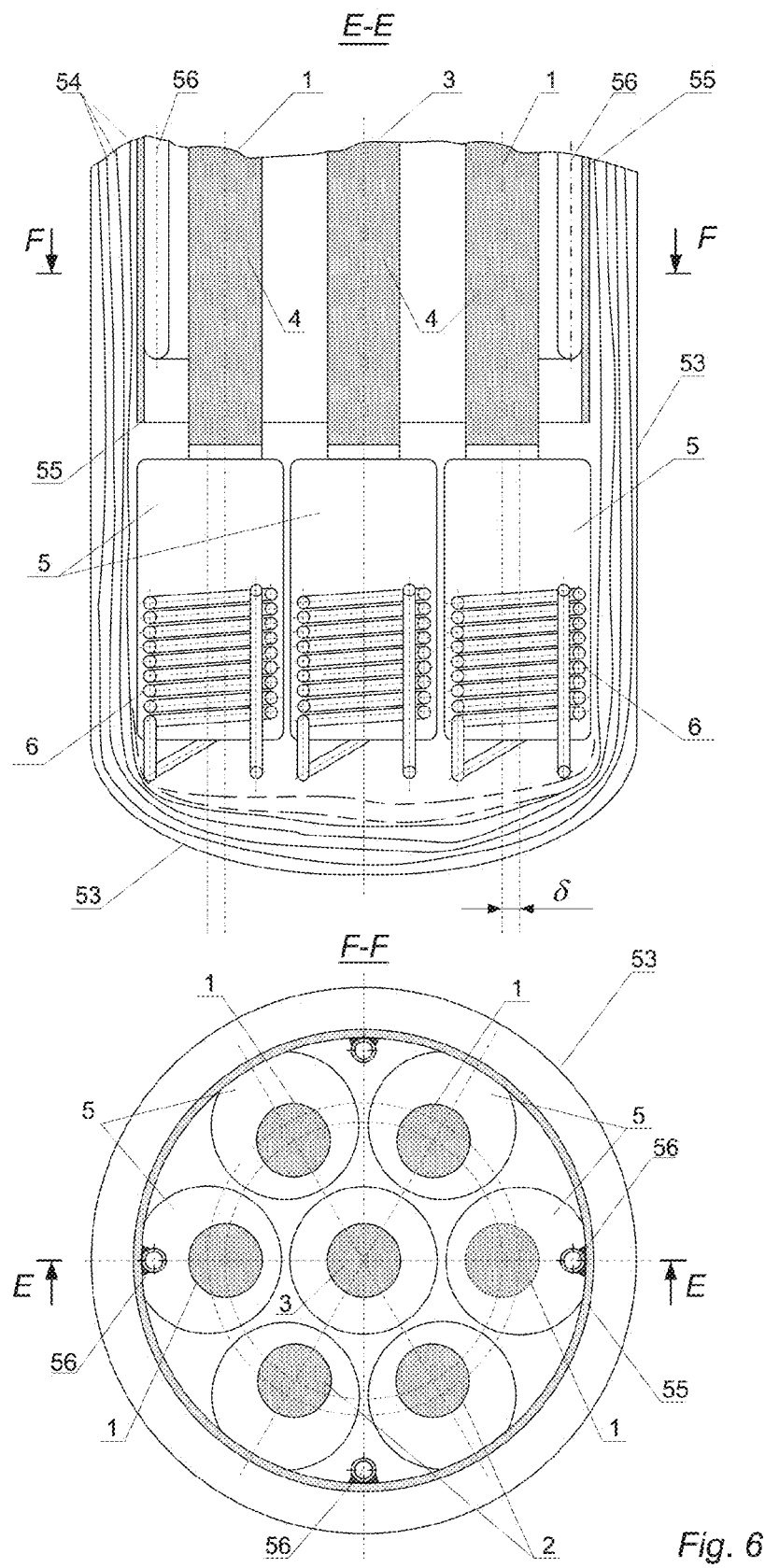
FIG. 6 shows longitudinal (E-E) and cross-sectional (F-F) views of the bottoms for the device, in accordance with FIGS. 1 and 2, where the bottoms of the rectification columns in the first (head) and the second sections of the column are located at the same distance from the axis of the shell, and the bottoms of the said rectification columns are made with eccentricity relative to the axes of the rectification columns.

Rectification columns, blocks of condensers, bottoms unit, gas heat exchangers 23 and 25, and also a submerged heat exchanger 24 and a separator 27 are housed in a vacuum jacket 53 (FIG. 1). External heat flows are shielded by using a multilayer insulation 54 and a nitrogen screen 55 (FIGS. 1 and 6). The nitrogen screen 55 is in thermal contact with the gaseous refrigerant line 56, which is connected to a vacuum pump 57. The submerged heat exchanger 24 is also supplied with the line of nitrogen vapors discharge 58, which is used in the start-up period with the cooling device and with the turned off vacuum pump 57.

Submerged evaporators 6 (FIG. 6) are installed in the cavities of the bottoms 5 of the rectification columns of the first 1, the second 2 and the third 3 sections. Moreover, to reduce the radial dimension, a group of peripheral rectification columns of the head (first) 1 and the second 2 sections is located at the same distance from the axis of the jacket, and the bottoms of said rectification columns are shifted relative to the axes of the rectification columns on the value of $\delta=(0.5\ldots1.5)\cdot R$, where R is the radius of contact spaces in relation to the axes of the corresponding bottoms. This reduces the diameter of the nitrogen screen 55 within the contact spaces 5 and dimensions of the vacuum jacket 53.

The device for separating gas mixtures in rectification columns for a particular case shown in FIG. 1 operates in the following way.

Compressor 21 compresses the working body, entering from the cavities 10 of the cooling medium on the line 13 of the return flow. Direct flow of the working body of high pressure, for example, P=140 bar, supplied on the line 22, is cooled in the first recuperative gas heat exchanger 23 to T≈100 K. Then the temperature of the direct flow drops to T≈80 K in the submerged heat exchanger 24 and further in the second recuperative gas heat exchanger 25 to T≈52 K. In the submerged heat exchanger 24 reduction of the temperature of the working body and the separable mixture (for example, natural neon) supplied on the line 17 occurs owing to the boiling of liquid nitrogen at P=0.3-1.0 bar, in the first and second recuperative heat exchangers 23 and 25 due to the return flow of the working body in the line 13, and in the first gas heat exchanger also due to the nitrogen vapors supplied on lines 56 and 58.

In the throttle 26 pressure of the direct flow falls to the level P=5.4-21.8 bar. Moreover, after the throttle 26, 50-60% of liquid is formed in the stream, and the temperature drops to T=34-43 K correspondingly. In the separator 27 working body of low pressure separates into two phases: gaseous and liquid. Gaseous phase on the line 20 is fed to the inlet of submerged evaporators 6 and enables boiling of heavy component in the bottoms 5, partially condensing in the process. Flow rate of the working body through the submerged evaporators 6 of each column is established using flow control regulators 15. Liquid phase from the separator 27 is fed through throttles 28, mixed with the vapor-liquid streams of the working body after the flow control regulators 15, and at the pressure about P=1.5 bar, (abs.) enters the cavities 10 of the cooling medium of the rectification columns of the head (first) 1, the second 2 and the third 3 sections.

Cooling medium 9, as a result of boiling on the heat exchange surfaces 8, is converted into gas, which is withdrawn from cavity 10 of the cooling medium through outlet connecting pipes 12, fed to the line 13 of return flow of the working body and enters the compressor 21. The gaseous cooling medium is consecutively warmed in the second 25 and the first 23 recuperative gas heat exchangers.

As a result of applying heat to the liquid heavy component in the bottom 5 from the side of the submerged evaporators 6, vapor streams are formed, which go up along contact spaces 4 in the rectification columns of the head (first) 1, the second 2 and the third 3 sections.

Reaching the cold heat exchange surface 8 of the blocks 11 of condensers 7, vapors of the separable mixture pass to a liquid state. The liquid flows down flushing contact spaces 4. Enrichment of the liquid in the bottom with the heavy isotope component (in this case with neon $^{22}$Ne) occurs due to intensive mass transfer between this liquid (called reflux) and vapor streams, which are formed in the bottoms 5.

Simultaneously, light (prevailing) component $^{20}$Ne begins to accumulate in the upper parts of the contact spaces 4. The rarest component $^{21}$Ne is obtained at the first stage in the mixture with the heavy component ($^{22}$Ne) and accumulated in the contact spaces 4, gradually substituting a less valuable component $^{20}$Ne in them.

Liquid from the bottoms 5 of the rectification columns of the head (first) 1, and the second 2 sections is withdrawn on the lines 18. Furthermore, the heavy component of the group of rectification columns of the first section 1 is introduced in the form of liquid for further enrichment in the group of rectification columns of the second sections 2, and its bottom liquid- to the rectification column of the third section 3, from whose bottom the heavy component $^{22}$Ne is withdrawn as a product on the line 19.

The separable mixture, pre-cooled in the first 23 and the second 25 recuperative gas heat exchangers and also in the submerged heat exchanger 24, is fed in the middle of the contact space 4 of the group of rectification columns of the first section 1 on the line 17. Feed of the separable mixture, containing 0.27% $^{21}$Ne, and withdrawal of the light $^{20}$Ne and the heavy $^{22}$Ne components on the lines 16 and 19, respectively, allows accumulation of $^{21}$Ne in the contact space 4 of the rectification column of the third section 3.

To ensure the operation of the connected in series sections and to provide feeding the liquid heavy component from the group of rectification columns of the head section 1 to the group of rectification columns of the second section 2, and from there to the rectification column of the third section 3, without a compressor, a driving pressure difference is generated between the columns $P_1 > P_2 > P_3$.

Under the same cooling conditions in the condensers 7, a driving pressure difference between the columns $P_1 > P_2 > P_3$ required for the operation is provided by adjusting flow control regulators 15 of the submerged evaporators 6. To obtain pressure difference (for example, $P_1=3.5$ bar, $P_2=3$ bar и $P_3=2.5$ bar), flow rates of the working body through the submerged evaporators 6 in the bottoms 5 of the columns of the preceding section are set higher than through the submerged evaporators in the bottoms of the subsequent section $G_1 > G_2 > G_3$ (FIG. 1, 6). Furthermore, to ensure compactness, groups of peripheral rectification columns of sections 1 and 2 are located at the equal distance from the axis of the jacket, and the bottoms of said rectification columns are made with eccentricity δ in relation to the axes of the rectification columns 1 and 2.

The blocks 11 of condensers 7 of the rectification columns (FIG. 1-5) operate the following way.

Vapor-liquid stream of the working body is fed into the cavities 10 of the cooling medium through the inlet connecting pipes 14. The stream is separated into liquid 9 and gas, which is immediately removed through the outlet connecting pipe 12 into the line 13 of the return flow of the working body. Layers of liquid 9 are washed outside by the heat exchange surfaces 8 in the form of tubes installed between the upper (31, 32, 35, 37) and lower (33, 34, 36, 38) tube sheets. Inner surfaces of the tubes of the corresponding condensers 7 are connected with the contact spaces 4 of the rectification columns of the head (first) 1, the second 2 and the third 3 sections. Temperature difference ΔT=2-4 K is ensured between the vapors of the separable mixture in the tubes of the heat exchange surfaces 8 and the boiling cooling medium 9. On account of this, vapors of the separable mixture are condensed inside the tubes and form a reflux which accumulates in the lower collectors 41, 42, 45, 46 of the group of rectification columns of the head (first) 1 section, lower collectors 49, 50 of the group of rectification columns of the second section 2 and the lower collector 52 of the rectification column of the third section 3. Reflux streams from the lower collectors are directed to the contact spaces of the corresponding rectification columns. Simultaneously, the boiling cooling medium outside the heat exchange surfaces 8 boils, and the formed gaseous stream goes to the line 13 of the return flow of the working body through the outlet connecting pipes 12. Identical levels of the liquid cooling medium 9 (FIG. 2-4) are achieved due to the upper 29 and lower 30 lines between the cavities 10 of the cooling medium in the blocks 11 of condensers 7 of rectification columns of the head (first) 1 section.

Light component is accumulated in the upper collectors 39, 40, 43, 44 of the group of rectification columns of the head section 1, upper collectors 47, 48 of the group of rectification columns of the second section 2 and the upper collector 51 of the rectification column of the third section 3. Light component ($^{20}$Ne) is removed from the stripping lines 16 through flow meters to gasholders (not shown) and is periodically pumped into cylinders.

Table 1 summarizes the data on the processes specific to the refrigeration cycle, ensuring the work of the complex of rectification columns for the separation of neon to isotopes.

Concentrations Z, X и y of the heavy component ($^{22}$Ne) at the inlet and outlet of the rectification columns for the schematic diagram represented in FIG. 7 is determined the following way.

Let us assume that the isotope mixture consists of two prevalent components: light "L" and heavy "T" and has initial concentration according to the component "T", for example, Z=0.095 (9.5%). From this point on, considering a binary composition of the mixture, all concentrations are reduced exclusively to the component "T." Then the fraction of the component "L" will be (1-Z). For example, for the accepted composition of the initial mixture, composition of the light component will be (1-Z)=1-0.095=0.905; (90.5%).

As a result of the separation, e.g., by fractional condensation, two streams are obtained. With respect to the initial mixture, one of the streams (liquid) will be more enriched with the heavy component "T" X=0.097>Z. At the same time, decrease of concentration of the component "T" Y=0.093<Z (i.e. it will be enriched in the light component "L") will occur in the vapor stream. Within a single fractionation step (a theoretical plate) concentration difference between the flows of liquid and vapor is expressed by the formula [Apelblat A. The Theory of a Real Isotope Enriching Cascade/A. Apelblat, Y. Ilamed-Lehrer//Journal of Nuclear Energy. —Vol. 22. —July 1967. —P. 1-26.], [A. I. Brodsky, *Stable Isotopes of Light Elements,*/Success of Physical Sciences, volume. XX, issue. 2, 1988. pp. 153-182]

$$\alpha = \frac{\frac{X}{1-X}}{\frac{\acute{o}}{1-\acute{o}}}. \tag{1}$$

In formula (1), relative concentration of the heavy and light components in the liquid is in the numerator; relative concentration of the heavy and light components in the vapor is in the denominator; α—separation factor (for the isotope pair $^{20}$Ne—$^{22}$Ne α≈1.04 *[Theory of Isotope Separation in Columns*, A. M. Rozen, Moscow, 1960 p. 437]. If the change in the composition of one of the streams (X or Y) is measured from the initial concentration of Z, then the change in the concentration of streams will be less expressed. In this case, the following value is used as an approximate value of the characteristics of the process $$\beta = \sqrt{\alpha}. \quad (2)$$

$$\beta = \frac{\frac{X}{1-X}}{\frac{Z}{1-Z}} \text{ or } \quad (3\text{-}a)$$

$$\beta = \frac{\frac{Z}{1-Z}}{\frac{Ó}{1-Ó}} \quad (3\text{-}b)$$

To enhance separation efficiency, the process is repeated several times, using in each fractionation step the obtained (previously enriched in a particular component) stream. This procedure can be performed, for example, in a rectification column which has k conditional plates. Then the result of enrichment of the column (below and above the feeding point of the initial mixture) is expressed by the relations, respectively $$\beta^k = \frac{\frac{X}{1-X}}{\frac{Z}{1-Z}} \text{ or } \quad (4\text{-}a)$$

$$\beta^k = \frac{\frac{Z}{1-Z}}{\frac{Ó}{1-Ó}} \quad (4\text{-}b)$$

With respect to the lower portion of the column, intended to concentrate the heavy component "T" (or $^{22}$Ne), formula 4-a may be represented as $$X = \frac{\beta^k \cdot \frac{Z}{1-Z}}{1 + \left(\beta^k \cdot \frac{Z}{1-Z}\right)}. \quad (5)$$

The last equation establishes the relationship between the composition of the mixture fed to the column Z (for the heavy component), the separation factor of the components β, the number of transfer units (theoretical plates) k in the lower portion of the rectification column and the concentration X of the bottoms product. We apply the formula (5) for connected in series sections (FIG. 7). Assuming that the bottoms mixture of the preceding section is fed to the following section and, using the balance equations for the component "T", you can determine the mixture flow rate at the feeding point to each stage. Calculation of flow characteristics for 4 (FIG. 7) connected in series sections intended for the initial enrichment of the bottom fraction with the heavy component "T" in case of isotope separation of the pair $^{20}$Ne—$^{22}$Ne with the natural composition Z=9.5% for neon $^{22}$Ne is shown below, in a tabular form (Table 2). As follows from Table 2 in this example mixture flow rates at the inlet to the sections 1, 2, 3 and 4 are related as 160:79:40:22≈8:4:2:1, which roughly corresponds to the geometric progression with ratio=2.

Note: Obtaining an absolutely correct ratio of the flow rate in sections is not the goal of the calculations. For example, this problem is solved by changing the recovery degree $C_{T1}$=0.814; $C_{T2}$=0.78 and $C_{T3}$=0.74 to an accuracy of 1%.

Area of the cross section of the contact space of the rectification column in each section, under the same operating conditions is largely determined by the flow rate of the mixture fed to the column. Change (decrease) of the feed mixture flow rate and equivalent cross section of the contact spaces of the rectification columns is achieved by forming initial sections from the groups of columns of equal diameter. In this case, the number of columns $n_j$ in each group forming N connected in series sections changes according to the law of geometric progression $n_j = n_1 \cdot (r+1)^{1-j}$, where r is a natural number, and the first member $n_1$ is equal to the number of columns in the group forming the head section. Besides, $n_1 = (r+1)^{N-1}$.

Besides the feed mixture flow rate, other operational factors influence the vapor velocity in the rectification column (hence, the cross section of its contact structure). Reflux ratio and the pressure of rectification are among them. Nevertheless, the impact of the operating parameter modes does not dismiss the possibility and viability of the formation of connected in series sections from the groups of columns, whose number decreases according to the law of geometric progression. On the contrary, these operating parameters can be regarded as additional "degrees of freedom", which will substantially increase the range of operating conditions for the devices formed from parallel connected groups of single type rectification columns.

Useful model makes it possible to simplify step separation of isotope mixtures in rectification columns. Reduction in metal consumption of a low-temperature block due to elimination of a part of heat exchange apparatuses and use of compact condenser units and bottoms allows reducing radial dimensions and the volume of a vacuum jacket. Reducing the quantity of external heat leakage leads to the reduction of power consumption in the refrigeration cycle and promotes stable operation of the rectification columns.

Formation of the head and initial steps from several rectification columns improves throughput capacity of the device based on the initial mixture without sacrificing separation efficiency. Owing to this solution, the start-up period is reduced because several columns of the first section essentially work for the final column in whose contact space the accumulation of the target product occurs. In addition, reduction of the duration of a start-up period in the process of separation hard to separate mixtures, for example, neon isotopes, is achieved due to elimination from the diagram of the volumes of gas lifts which are not involved in rectification. Instead, driving pressure difference needed to feed the mixture from one section to another is produced by a change in heat flows in the bottom evaporators. Increase of efficiency and quality of separation of gas mixtures ensures acquisition of rare components, such as isotope $^{21}$Ne.

The proposed schematic diagram of the refrigeration cycle is consistent with the process loop, providing a pressure difference between the columns, sufficient for feeding a separable mixture from section to section without a compressor. Utility of the protected technical solutions is confirmed in the process of development and operation of the industrial scale plants for manufacture of neon isotopes, including $^{21}$Ne.

TABLE 1

Parameters of flows of the working body and the separated isotope mixture on the example of neon (according to the schematic FIG. 1)

| Process character | Parameters (absolute pressures) | |
|---|---|---|
| | start | end |
| Working body (neon) | | |
| Throttling of the working body of high pressure in the throttle 26 | T = 52к; P = 140 bar | T = 38.7к; P = 12 bar. Liquid fraction φ = 53% |
| Separation of the vapor-liquid mixture in the phase separator 27 | T = 38.7к; P = 12 бар. Liquid fraction φ = 53% | Saturated vapor, φ = 0 Liquid, φ = 100% |
| Partial separation of the working body in submerged evaporators 6 | T = 38.7к; P = 12 bar. Saturated vapor, φ = 0 | T = 38.7к; P = 12 bar. Liquid fraction φ = 70% |
| Throttling in the flow control regulators 15 | T = 38.7к; P = 12 bar. Liquid fraction φ = 70% | T = 28.5к; P = 1.5 bar. Liquid fraction φ = 50% |
| Throttling of the liquid working body of low pressure in throttles 28 | T = 38.7к; P = 12 bar. Liquid fraction φ = 100% | T = 28.5к; P = 1.5 bar. Liquid fraction φ = 69% |
| Mixing of streams of the working body before the cavity 10 of the cooling medium | T = 28.5к; P = 1.5 bar. Liquid fraction φ = 69%; φ = 50%. | T = 28.5к; P = 1.5 bar. Liquid fraction φ = 58% |
| Mixture separation in the cavity 10 into vapor and liquid | T = 28.5к; P = 1.5 bar. Liquid fraction φ = 58% | Saturated vapor, φ = 0 Liquid, φ = 100% |
| Boiling of the cooling medium 9 in the cavity 10 | T = 28.5к; P = 1.5 bar. Liquid fraction φ = 100% | T = 28.5к; P = 1.5 bar. Saturated vapor, φ = 0 |
| Isotope mixture to be separated (neon) | | |
| Boiling of the heavy component in the bottoms 5, condensation of vapors of the light component on the inner heat exchanging surfaces 8 of condensers 7 | $T_1$ = 31.9 к; $P_1$ = 3.5 bar, (first section) $T_2$ = 31.2 к; $P_2$ = 3 bar, (second section) $T_3$ = 30.5 к; $P_3$ = 2.5 bar, (third section) | |

TABLE 2

Concentrations of Z, X и y are given according to the target product (heavy component) $^{22}$Ne

| Name | Source, formula | Numerical value |
|---|---|---|
| Separation coefficient of the isotope components ($^{20}$Ne-$^{22}$Ne) | [3], relative volatility of the isotope pair $^{20}$Ne-$^{22}$Ne | α = 1,040 |
| Separation coefficient of the isotope pair $^{20}$Ne-$^{22}$Ne | [4] | $\beta = \sqrt{\alpha} = 1,020$ |
| Concentration of the heavy component at the inlet to the first section | [6], isotope fraction $^{22}$Ne in natural neon | $Z_1$ = 0.095; (9.5%) |
| Number of transfer units in the stripping part of each section (below the mixture feed point) | Assigned | $k_1 = k_2 = k_3 = k_4 = 28$ |
| Concentration of the mixture heavy component at the outlet from the column bottom of the j - step | $X_j = \dfrac{\beta^k \cdot \dfrac{Z_j}{1-Z_j}}{1+\left(\beta^k \cdot \dfrac{Z_j}{1-Z_j}\right)}$ | j = 1: $X_1$ = (1.741 · 0.105)/1.183 = 0.155<br>j = 2: $X_2$ = (1.741 · 0.183)/1.318 = 0.241<br>j = 3: $X_3$ = (1.741 · 0.318)/1.554 = 0.356<br>j = 4: $X_4$ = (1.741 · 0.554)/1.964 = 0.491 |
| Extraction degree of the heavy component in sections | $C_{Tj} = \dfrac{G_j \cdot X_j}{V_j \cdot Z_j} = \dfrac{v_{(j+1)}}{v_j}$ | $C_{T1} = C_{T2} = C_{T3}$ = 0.8; (80%) |
| Section flow rate characteristics j = 1 | | |
| Entire flow rate at the inlet | Assigned | $V_1$ = 160 dm³/h |
| Flow rate at the inlet according to the heavy component ($^{22}$Ne) | $v_1 = V_1 \cdot Z_1$ | = 160 · 0.095 = 15.2 dm³/h |
| Exit of the heavy component from the column bottom ($^{22}$Ne) considering extraction degree | $v_2 = v_1 \cdot C_{T1}$ | = 15.2 · 0.8 = 12.2 dm³/h |
| Entire flow rate at the outlet (FIG. 7) | $G_1 = V_2 = \dfrac{v_2}{X_1}$ | = 12.2/0.155 = 78.7 dm³/h |
| Balance: | $g_1$ = 81.3 dm³/h; $y_1$ = 0.037 (3.7%); $g_1 \cdot y_1 + v_2 = 3 + 12.2 = 15.2$ dm³/h = $v_2$ | |
| Section flow rate characteristics j = 2 | | |
| Entire flow rate at the inlet | $V_2 = G_1$ | $V_2$ = 78.7 dm³/h |
| Exit of the heavy component | $v_3 = v_2 \cdot C_{T2}$ | = 12.2 · 0.8 = 9.7 dm³/h |

TABLE 2-continued

Concentrations of Z, X и y are given according to the target product (heavy component) $^{22}$Ne

| Name | Source, formula | Numerical value |
|---|---|---|
| from the column bottom ($^{22}$Ne) considering extraction degree | | |
| Entire flow rate at the outlet | $G_2 = V_3 = \dfrac{v_3}{X_2}$ | = 9.7/0.241 = 40.2 dm$^3$/h |
| Balance: | $g_2$ = 38.5 dm$^3$/h; $y_2$ = 0.063 (6.3%); $g_2 \cdot y_2 + v_3$ = 2.4 + 9.7 = 12.1 dm$^3$/h = $v_3$ Section flow rate characteristics j = 3 | |
| Entire flow rate at the inlet Exit of the heavy component from the column bottom ($^{22}$Ne) considering extraction degree | $V_3 = G_2$ $v_4 = v_3 \cdot C_{T3}$ | $V_3$ = 40.2 dm$^3$/h = 9.7 · 0.8 = 7.8 dm$^3$/h |
| Entire flow rate at the outlet | $G_3 = V_4 = \dfrac{v_4}{X_3}$ | $V_4$ = 7.8/0.356 = 21.9 dm$^3$/h |
| Balance: | $g_3$ = 18.3 dm$^3$/h; $y_3$ = 0.105 (10.5%); $g_3 \cdot y_3 + v_4$ = 1.9 + 7.8 = 9.7 dm$^3$/h = $v_4$ | |

TABLE 3

Results of the calculation of the number of columns $n_j$ in groups, which form N-consecutively connected sections according to the law $n_j = n_1 \cdot (r+1)^{1-j}$, where $n_1 = (r+1)^{N-1}$ - is the number of columns in the group, making up the head section, r - is a natural number (1, 2, 3 . . . ).

| N | N − 1 | r | (r + 1) | j | 1 − j | $n_j$ | N | N − 1 | r | (r + 1) | j | 1 − j | $n_j$ |
|---|---|---|---|---|---|---|---|---|---|---|---|---|---|
| 2 | 1 | 1 | 2 | 1 | 0 | $n_1$ = 2 | 2 | 1 | 2 | 3 | 1 | 0 | $n_1$ = 3 |
|   |   |   |   | 2 | −1 | $n_2$ = 1 |   |   |   |   | 2 | −1 | $n_2$ = 1 |
| 3 | 2 | 1 | 2 | 1 | 0 | $n_1$ = 4 | 3 | 2 | 2 | 3 | 1 | 0 | $n_1$ = 9 |
|   |   |   |   | 2 | −1 | $n_2$ = 2 |   |   |   |   | 2 | −1 | $n_2$ = 3 |
|   |   |   |   | 3 | −2 | $n_3$ = 1 |   |   |   |   | 3 | −2 | $n_3$ = 1 |
| 4 | 3 | 1 | 2 | 1 | 0 | $n_1$ = 8 | 4 | 3 | 2 | 3 | 1 | 0 | $n_1$ = 27 |
|   |   |   |   | 2 | −1 | $n_2$ = 4 |   |   |   |   | 2 | −1 | $n_2$ = 9 |
|   |   |   |   | 3 | −2 | $n_3$ = 2 |   |   |   |   | 3 | −2 | $n_3$ = 3 |
|   |   |   |   | 4 | −3 | $n_4$ = 1 |   |   |   |   | 4 | −3 | $n_4$ = 1 |
| 5 | 4 | 1 | 2 | 1 | 0 | $n_1$ = 16 | 2 | 1 | 3 | 4 | 1 | 0 | $n_1$ = 4 |
|   |   |   |   | 2 | −1 | $n_2$ = 8 |   |   |   |   | 2 | −1 | $n_2$ = 1 |
|   |   |   |   | 3 | −2 | $n_3$ = 4 | 3 | 2 | 3 | 4 | 1 | 0 | $n_1$ = 16 |
|   |   |   |   | 4 | −3 | $n_4$ = 2 |   |   |   |   | 2 | −1 | $n_2$ = 4 |
|   |   |   |   | 5 | −4 | $n_4$ = 1 |   |   |   |   | 3 | −2 | $n_3$ = 1 |

We claim:

1. A device for separating gas mixtures in rectification columns, comprising: housed in a jacket of the rectification columns, forming connected in series a head and (N−1) consecutively installed sections, containing contact spaces, whose lower areas are connected with bottoms, containing submerged evaporators, and upper areas are connected with condensers, whose number corresponds to a number of the rectification columns, manufactured in a form of upper and lower tube sheets, collectors, a set of tubes, whose inner surfaces contact with a separable mixture in the rectification columns, and outer surfaces—with a cooling medium in cavities of the cooling medium, which, through gas recuperative heat exchangers, are connected by a line of a working body return flow to a compressor, a submerged heat exchanger and a working body separator with a connecting pipe of a gas phase, wherein the condensers are grouped in blocks of condensers in the sections which have common cavities of the cooling medium and, at least, one of the N installed sections consists of groups of $n_j$ (j=1 . . . N) rectification columns connected in parallel.

2. The device of claim 1, wherein the number $n_j$ of rectification columns connected in parallel in the j-sections changes according to geometric progression $n_j=n_1 \cdot (r+1)^{1-j}$, where r is a natural number and $n_1$ is equal to the number of the connected in parallel rectification columns in the head section; wherein, $n_1=(r+1)^{N-1}$.

3. The device of claim 1, wherein the condensers of the blocks of condensers in the sections have the tubes of equal height and identical tube sheets, and the cavities of the cooling medium of the condensers of the blocks of condensers in the sections are connected with each other in the upper and lower parts by two lines providing the same levels of liquid in the cavities of the cooling medium.

4. The device of claim 1, wherein the tube sheets of the blocks of condensers in the sections have a form of a ring or a fragment thereof and are mounted coaxially with a condenser of an N-section, which is made cylindrical.

5. The device of claim 1, wherein the upper and the lower tube sheets of each condenser in the block of condensers are supplied with the collectors forming pairs of closed cavities connected with each other via tube inner cavities of the condenser heat exchange surfaces.

6. The device of claim 1, wherein lateral sides of the cavity of cooling medium of each condenser in the block of condensers in the sections are connected with the tube sheets which perform a function of a bottom of the cooling medium cavity of the condensers of the blocks of condensers.

7. The device of claim 1, wherein at least one of the rectification columns is shifted relative to an axis of the jacket; wherein the bottoms of the rectification columns are made with an eccentricity relative to axes of the corresponding rectification columns.

* * * * *